(No Model.)

W. W. DEBTH.
TIRE SIZER.

No. 426,492.  Patented Apr. 29, 1890.

WITNESSES
Carroll J. Webster.
Anna J. Lehaney.

INVENTOR
William W. Debth
By William Webster
Atty

UNITED STATES PATENT OFFICE.

WILLIAM W. DEBTH, OF TOLEDO, OHIO, ASSIGNOR TO THE PAGE STEEL WHEEL COMPANY, OF SAME PLACE.

TIRE-SIZER.

SPECIFICATION forming part of Letters Patent No. 426,492, dated April 29, 1890.

Application filed June 17, 1889. Serial No. 314,623. (No model.)

*To all whom it may concern:*

Be it known that I, WILLIAM W. DEBTH, a citizen of the United States, residing at Toledo, in the county of Lucas and State of Ohio, have invented certain new and useful Improvements in Tire-Sizers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to tire-sizers, and has for its object to construct a device for forming tires to a uniform size that shall be accurate in expansion, cheap of construction, and easily managed.

The invention consists in providing a metal annulus with means for expanding the same to a predetermined size, whereby to expand a tire placed thereon to a desired diameter.

Figure 1:
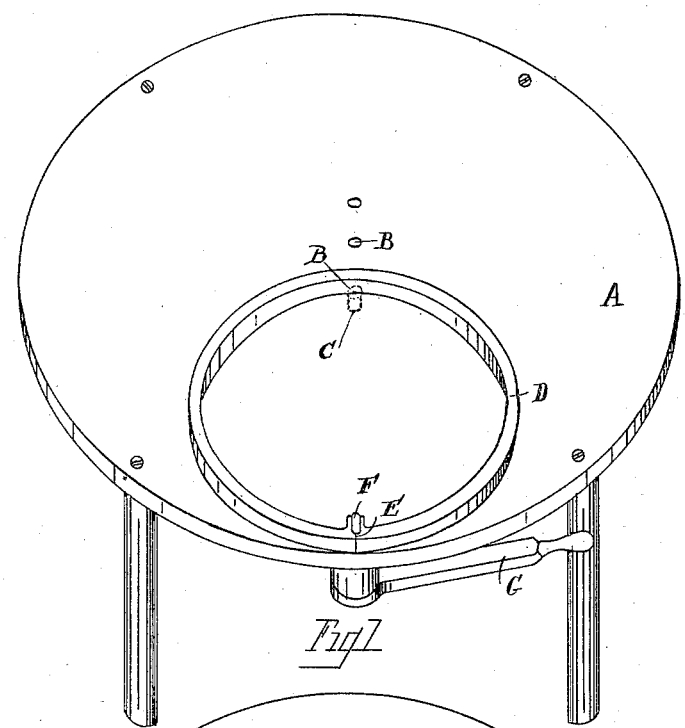
Figure 2:
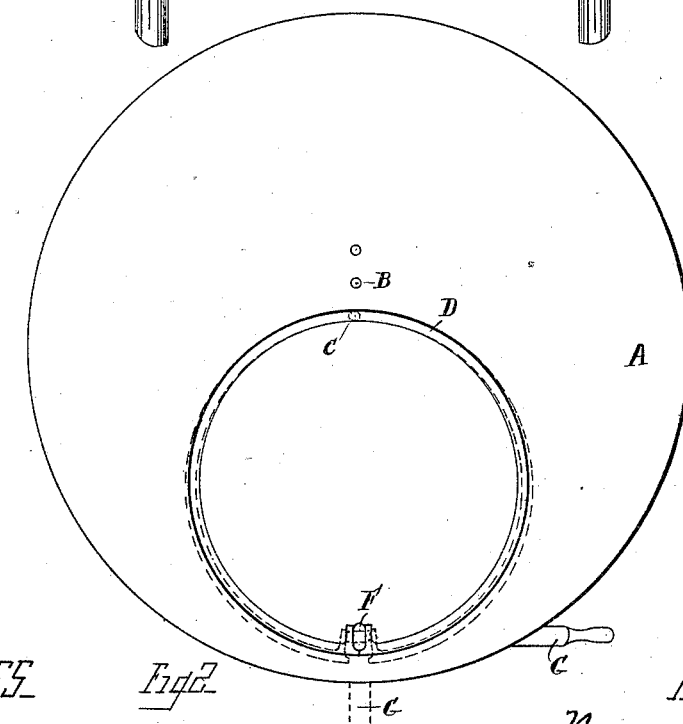
Figure 3:
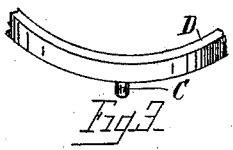

In the drawings, Figure 1 is a perspective view of a complete device. Fig. 2 is a plan view, and Fig. 3 is an elevation, of a section of the expansible ring, showing the stud for securing the ring in place upon the plate.

In the art of making metal wheels it is essentially necessary that the metal tire shall be of a uniform diameter to insure a perfect set of wheels, and especially is this necessary when the spokes are riveted by machinery, as it is necessary in the latter case that the spokes be a uniform distance apart.

Heretofore in the manufacture of metal wheels a great difficulty has been experienced in securing sets of wheels of the same diameter, and in the improved art of riveting the spokes mechanically it is absolutely essential that the tires shall be of the same diameter, to cause like spaces between the spokes, that the reciprocating riveter may be in alignment with the end of the same.

Prior to my invention, to secure a uniformity of diameter, the tires have been necessarily assorted and laid in piles of like diameters, requiring great skill and delay.

The object of my invention is to obviate this difficulty by means of an expansible ring, over which the tire is placed after being heated and welded, and while in a state of ductility expanding each tire to a like diameter.

A designates a metal plate perforated diametrically at B to accommodate stud C of a ring D, there being a series of perforations B in plate A to allow of rings D of different diameters. The ring D is formed with the stud C and is split at a diametrically-opposite point, and preferably re-enforced, as at E, to form bearings for a cam F, pivoted in the plate A and connected with a lever G, preferably beneath the plate.

In operation a ring D of the preferred diameter is placed upon plate A, and the stud C of the ring is placed in the perforation B, that will cause the opposite periphery to register with the cam F. With the device thus arranged, when the tire is welded it is placed over the ring and the lever G is turned to cause the cam to spread the ring to the full extent of the cam, and thereby expand or draw the tire to the circumference of the expanded ring. Then the lever is reversed and the tire removed, this operation insuring an even diameter to each tire.

It will be seen that the device is simple, inexpensive of construction, and effective of operation, and that to size or expand tires of any preferred diameter it is only necessary to remove a ring and substitute one of the desired expansible size.

What I claim is—

1. In a tire-sizer, a plate, a split ring secured thereon, a lever, and expanding device between the ends of the ring, as and for the purpose set forth.

2. In a tire-sizer, a plate, perforations in the plate diametrically of the same, in combination with an expansible ring having a stud to enter the perforations, and a lever mechanism for expanding the ring, as and for the purpose set forth.

In testimony that I claim the foregoing as my own I hereby affix my signature in presence of two witnesses.

WILLIAM W. DEBTH.

Witnesses:
WILLIAM WEBSTER,
CARROLL J. WEBSTER.